(12) United States Patent
Haussler

(10) Patent No.: US 8,917,431 B2
(45) Date of Patent: Dec. 23, 2014

(54) HOLOGRAPHIC COLOR DISPLAY DEVICE HAVING A COLOR FILTER WITH PARALLEL, VERTICAL COLOR STRIPES OF PRIMARY COLORS

(75) Inventor: Ralf Haussler, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 897 days.

(21) Appl. No.: 13/128,484

(22) PCT Filed: Nov. 10, 2009

(86) PCT No.: PCT/EP2009/064896
§ 371 (c)(1),
(2), (4) Date: May 10, 2011

(87) PCT Pub. No.: WO2010/052331
PCT Pub. Date: May 14, 2010

(65) Prior Publication Data
US 2011/0216383 A1    Sep. 8, 2011

(30) Foreign Application Priority Data
Nov. 10, 2008  (DE) .................. 10 2008 043 621

(51) Int. Cl.
| G03H 1/08 | (2006.01) |
| G03H 1/22 | (2006.01) |
| H04N 13/04 | (2006.01) |
| G02B 27/22 | (2006.01) |

(52) U.S. Cl.
CPC ........... *G02B 27/225* (2013.01); *G03H 1/2294* (2013.01); *H04N 13/0404* (2013.01); *H04N 13/0422* (2013.01); *G03H 2225/55* (2013.01); *H04N 13/0418* (2013.01); *G03H 2001/2242* (2013.01); *G02B 27/2214* (2013.01); *G03H 2001/2271* (2013.01); *G02B 27/2242* (2013.01)
USPC .............. 359/9; 359/22; 359/29; 359/32

(58) Field of Classification Search
None
See application file for complete search history.

(56) References Cited

U.S. PATENT DOCUMENTS

| 4,957,351 A | * | 9/1990 | Shioji ............................ 349/15 |
| 5,682,215 A |   | 10/1997 | Nishihara et al. |
| 5,696,552 A |   | 12/1997 | Aritake et al. |

(Continued)

FOREIGN PATENT DOCUMENTS

| DE | 10 2004 044 111 A1 | 3/2006 |
| WO | 99/50914 | 10/1999 |

OTHER PUBLICATIONS

International Search Report, dated Feb. 5, 2010, and Written Opinion, issued in priority International Application No. PCT/EP2009/064896.

*Primary Examiner* — Arnel C Lavarias
(74) *Attorney, Agent, or Firm* — Saul Ewing LLP

(57) ABSTRACT

A color filter with parallel, vertical color strips of the RGB base colors associated with the image separating element, the color strips repeating horizontally within the color filter in periodic fashion. The light modulator contains a sequence of two registered holograms for each base color interlaced into six pixel columns for a left observer eye and for a right observer eye, and the sequence is repeated horizontally in periodic fashion. The periods of the color filter and the hologram are arranged relative to one another with the same degree of expansion, with a color strip and at least two pixel columns with holograms of the base color of the color strip are associated with a separating element.

7 Claims, 3 Drawing Sheets

(56) References Cited

U.S. PATENT DOCUMENTS

| | | | |
|---|---|---|---|
| 5,930,037 A * | 7/1999 | Imai | 359/463 |
| 6,940,653 B2 * | 9/2005 | Favalora et al. | 359/619 |
| 2001/0001566 A1 | 5/2001 | Moseley et al. | |
| 2004/0001139 A1 * | 1/2004 | Kobayashi | 348/59 |
| 2008/0012850 A1 | 1/2008 | Keating, III | |
| 2008/0036759 A1 * | 2/2008 | Koike et al. | 345/419 |
| 2011/0063289 A1 * | 3/2011 | Gantz | 345/419 |

* cited by examiner

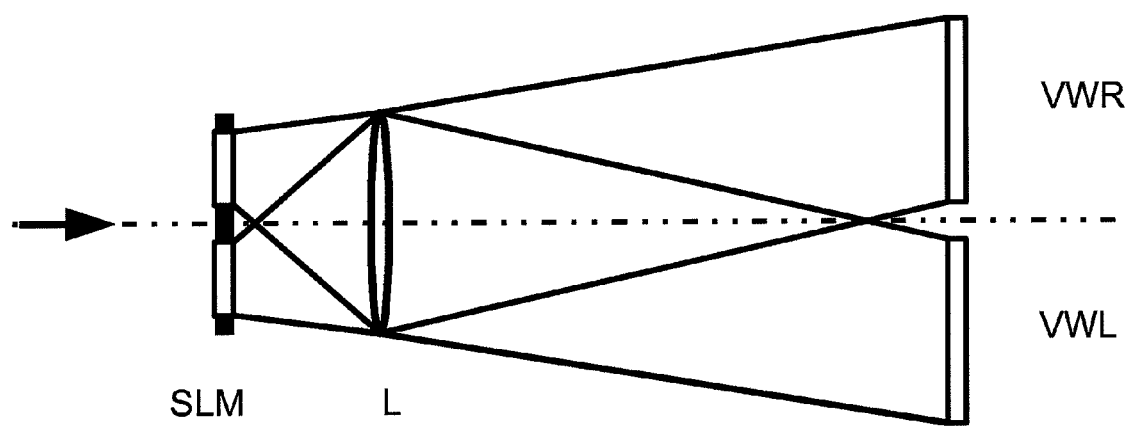
Fig. 1a
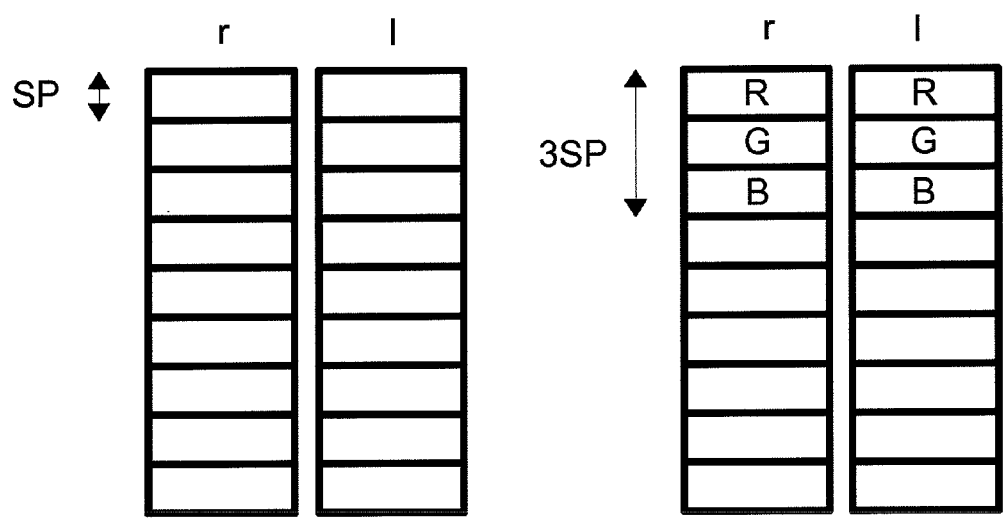
Fig. 1b
Fig. 1c

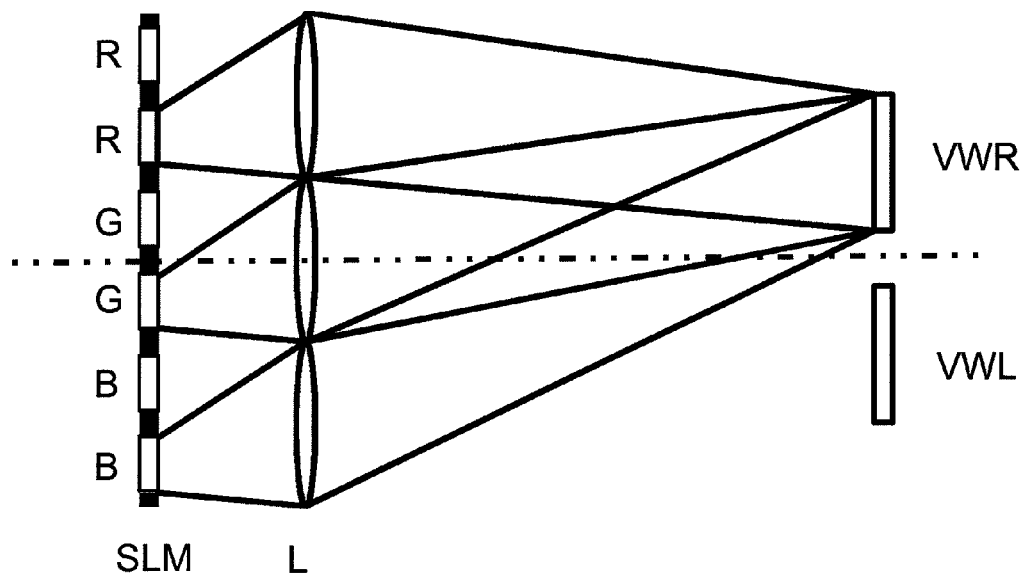
Fig. 2a
Fig. 2b
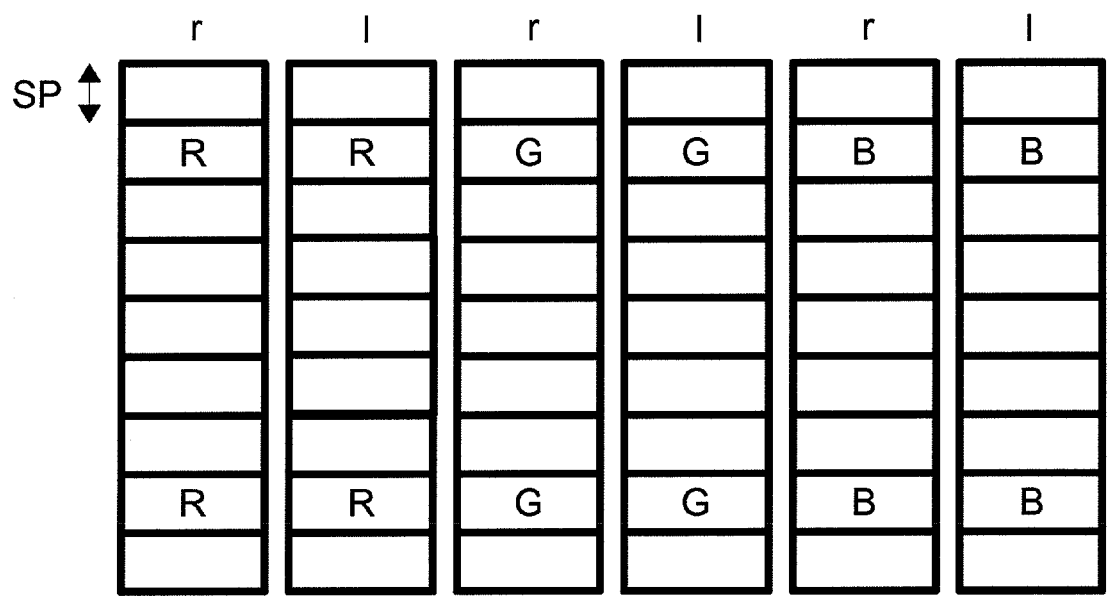

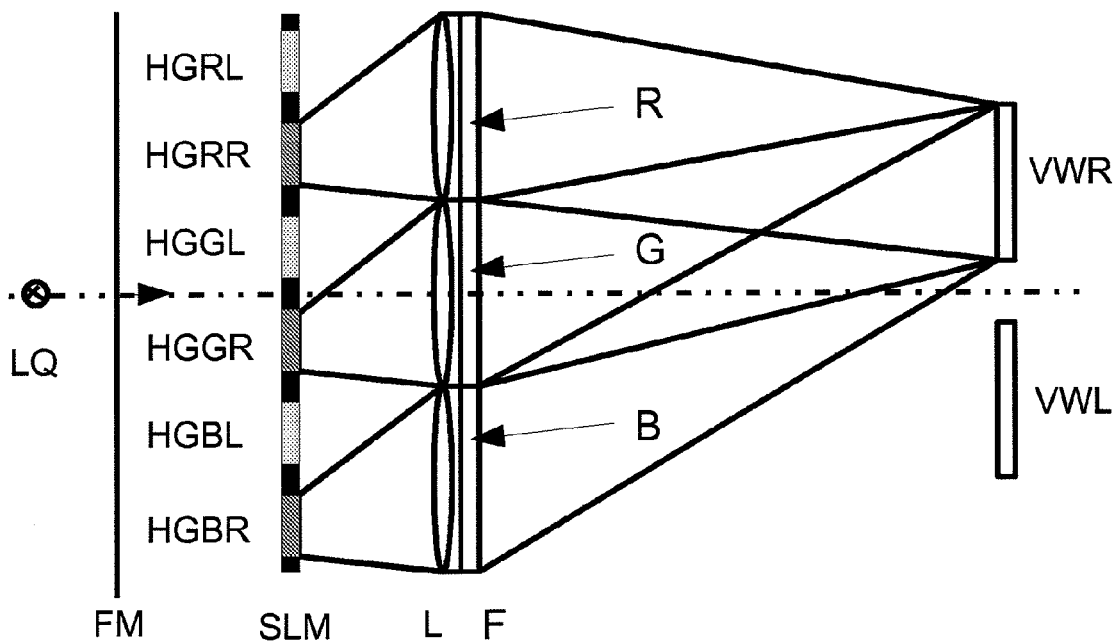
Fig. 3a
Fig. 3b
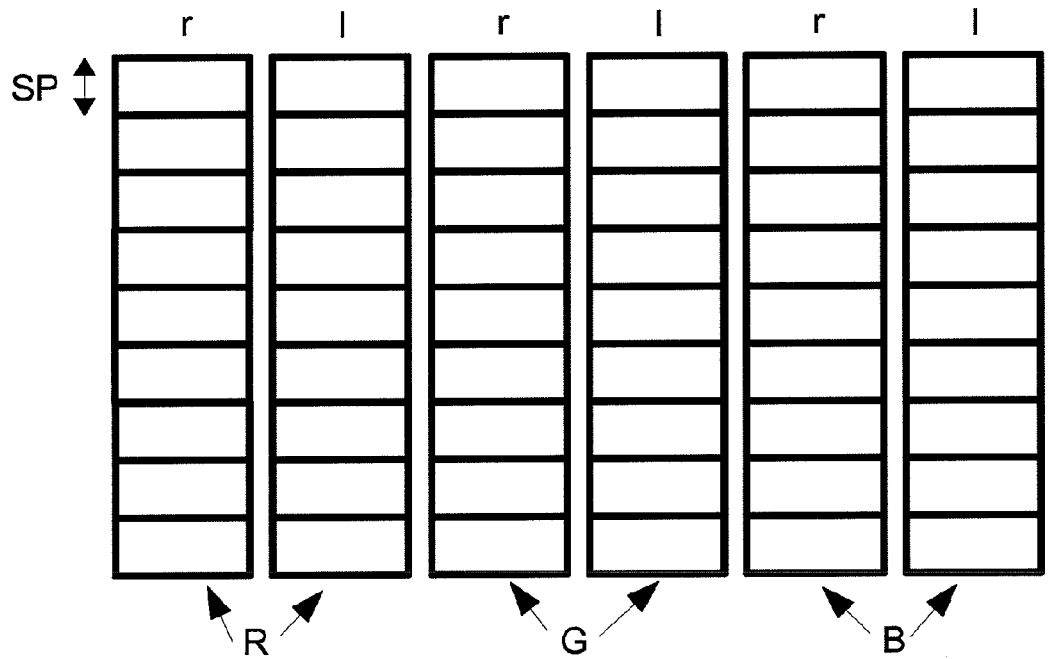

HOLOGRAPHIC COLOR DISPLAY DEVICE HAVING A COLOR FILTER WITH PARALLEL, VERTICAL COLOR STRIPES OF PRIMARY COLORS

CROSS REFERENCE TO RELATED APPLICATIONS

This application claims the priority of PCT/EP2009/064896, filed on Nov. 10, 2009, which claims priority to German Application No. 10 2008 043 621.6, filed Nov. 10, 2008, the entire contents of which are hereby incorporated in total by reference.

BACKGROUND OF THE INVENTION

The present invention relates to a holographic display where a colour reconstruction of a three-dimensional object is generated by way of space division colour multiplexing, and where this reconstruction is visible from visibility regions.

Document DE 10 2004 044 111 filed by the applicant describes a holographic display device for generating a monochromatic holographic reconstruction of a three-dimensional object (3D object). The present invention is based on that display. It comprises as main components light source means, focussing optical means, a controllable spatial light modulator (SLM) and an image separation means, which is realised for example in the form of a lenticular.

To maintain a certain clarity of the diagram, only two monochromatic pixels of a pixel matrix of the controllable light modulator SLM and only one separating element of the image separation means L are shown in the top view in FIG. 1a. The separating element is here a cylindrical lens of a lenticular. Two separate, column-wise interleaved one-dimensional holograms of the 3D object, which reconstruct a left and a right view of that object, respectively, are written to the SLM. Two pixel columns of the SLM are covered by one cylindrical lens, where the cylindrical lenses are arranged in parallel to the pixel columns. The arrangement of the pixel columns, which are denoted with l and r, is shown schematically in a front view in FIG. 1b. The pixel pitch which is relevant for the encoding is denoted with SP.

The cylindrical lenses image the pixel columns l and r into an observer plane. In synchronism with that, the focusing optical means also image light which is coherent in the vertical direction after the modulation in the SLM into the observer plane, where the light is superposed there to form visibility regions VWL and VWR for a left and right observer eye, respectively. The visibility regions VWL and VWR are diamond-shaped three-dimensional regions each of which forming an intersecting plane with the observer plane. The observer eyes must lie in that intersecting plane between two diffraction orders of the light used in order to be able to perceive the holographic representation of the 3D object. The light which falls on the pixels, as indicated by an arrow in the drawing, and which is spatially coherent in the vertical direction and spatially incoherent in the horizontal direction is emitted e.g. by line light sources.

The light source means and the focussing optical means, i.e. a lenticular, which serves as wave-optical means for realising the Fourier transformation (FT) at the same time, both of which being disposed upstream the SLM in the optical path, are not shown in FIGS. 1a to 1c so to maintain a certain clarity of the drawing.

According to the prior art, in order to generate a colour reconstruction which comprises the primary colours RGB, an individual hologram is computed for each colour and all three holograms are displayed on the SLM either simultaneously or sequentially. To realise a simultaneous display of the holograms by way of space division multiplexing, these holograms are spatially interleaved. Three primary colours and two observer windows thus mean that a six-fold multiplexing is required. The SLM is simultaneously illuminated with light emitted by RGB light sources, and standard colour filters which are accordingly assigned to the pixels of the SLM filter out the light for the respective pixels.

FIG. 1c shows schematically the front view of the standard arrangement of the pixel columns l and r of FIG. 1b for a colour 3D presentation. In this arrangement, three rectangular sub-pixels of the primary colours R, G and B together form a square pixel. The column denoted with l is imaged to the left visibility region VWL, and the column denoted with r is imaged to the right visibility region VWR. Three sub-pixels with the integrated colour filters R, G and B form a square pixel with a certain pitch, denoted with 3SP, which is relevant for the 1D encoding. 1D encoding here means that the hologram has a vertical movement parallax. Because only light of identical wavelength is able to interfere, the pitch 3SP which is relevant for the encoding is three times as large as in a monochromatic 3D presentation. The vertical extent of the visibility region is thus only ⅓ as large as in a monochromatic display.

FIG. 2a shows a different possibility of generating a colour holographic 3D presentation using an SLM with integrated RGB colour filters. They are assigned to two sub-pixel columns per colour and three cylindrical lenses of the image separation means L in the order RRGGBB (see FIG. 2b). Further, the two sub-pixel columns per colour comprise a left and a right hologram for that colour. Referring to FIG. 2a, a complete superposition of the sub-pixel images is realised, thereby forming visibility regions VWL and VWR which are larger than in the previously discussed example. The pitch SP which is relevant for the encoding is here again large enough to get visibility regions of same vertical extent as in a monochromatic display according to FIG. 1b. However, SLM with such a sequence of colour sub-pixels are not commercially available and can thus not be used for holographic reconstruction methods. The colour R, G or B is not indicated in each of the pixels in FIG. 2b in order to keep up clarity of the drawing.

Generally, the colour filters can be applied external to the cover glass of the SLM. However, this has the disadvantage that there will be a gap between the pixel arrangement and the colour filters which corresponds to the thickness of the glass plate of about 1 mm when applying the colour filters external to the cover glass of the SLM. Therefore, and because of the substantially smaller pixel pitch (<100 μm) of the colour sub-pixels, there are diffraction effects which cause under certain circumstances a disturbing crosstalk between neighbouring sub-pixels. Further crosstalk occurs if the optical path runs through the SLM and colour filter at an angle other than a right angle. This will be the case if the visibility regions are tracked to the observer by way of displacing the light sources. For an observer who is situated substantially off the central axis of the display and who perceives the light at an oblique angle, the light of a hologram which has been computed for a certain colour does not pass through the respective colour filter. That observer would therefore perceive a defective reconstruction. In the above-discussed example with a thickness of the cover glass of 1 mm and a pitch of 100 μm, this will be the case for angles greater than 6°, while a gradual deterioration already takes place at smaller angles. The viewing angle at which the display can be used is thus substantially limited, and the display cannot be used by multiple users.

These disadvantages are particularly grave when manufacturing prototypes or small series of holographic displays, because commercially available SLM panels or external colour filters must be used then. For this reason, it makes sense not to realise the colour presentation with the help of the SLM, but with the help of the optical means in the display device.

It is known from the prior art to realise the colour presentation in a display device with the help of colour filters in conjunction with optical imaging means, e.g. micro-lenses.

Document WO 99/50914 describes how coloured micro-lenses focus light which is emitted by a large light source on a small sensitive region, which can be a sensor or pixel. The function of a micro-lens is here combined with that of a colour filter in the form of a monochromatic micro-lens. The micro-lenses are given their shape with a curved surface which realises a certain inclination angle for the desired emission of monochromatic light during the manufacturing process. The LC molecules of a subsequently disposed LC layer, which are hit by monochromatic light in a small region, serve as switches and filter out the light according to the colour of the filter in that region. A processor combines three monochromatic pencils of rays to form one colour pixel, thus defining its colour and intensity. Colour display devices can thus be made with monochromatic micro-lenses, where one colour pixel is always represented by a group of three such monochromatic micro-lenses. This arrangement is suitable for colour representations with ordinary commercially available colour display panels. However, because the light is focussed on the pixels, that type of colour display is not suited for the above-mentioned holographic reconstruction principle. Additional imaging means had to be disposed in the optical path in order to focus the light on observer eyes. This would increase the structural depth and the weight of a flat display, which, however, shall be avoided.

Document U.S. Pat. No. 5,682,215 relates to a colour display with an array of micro-lenses where each micro-lens is tinted with one of the colours RGB. Thanks to the colour filtering, the coloured micro-lenses realise two functions on the light that passes through them. It is focussed specifically on one pixel in order to improve the brightness of the display and the aperture ratio. The micro-lenses are here tinted for example with colour pigments. Again, that colour display can only be used in a holographic display device and with a holographic reconstruction method as described above in conjunction with additional optical components for generating a visibility region.

SUMMARY OF THE INVENTION

It is the object of the present invention to realise a colour presentation of a holographic reconstruction of a 3D object in a display device with commercially available pixel array, where said colour reconstruction is generated with the help of a reconstruction method that involves space division multiplexing, and where the reconstruction is visible from a visibility region. The visibility regions shall be as large as possible, and it shall be possible to track them in a large angular range in front of the holographic display device to at least one observer if that observer moves to another position. Crosstalk shall be minimised. Moreover, the display device shall maintain its flat design.

The solution is based on a holographic display device which comprises in the optical path light source means, focussing optical means, a controllable light modulator, and an optical image separation means with vertically arranged separating elements, where the vertically light focussing optical means image sufficiently coherent light through the controllable pixels of the light modulator which are arranged in the form of a matrix, into an observer plane, where the light is superposed to form visibility regions for observer eyes, and where the separating elements of the optical image separation means image the pixel columns in which holograms are encoded into the respective visibility regions for each observer eye in synchronism with that. According to the proposed solution, external colour filters are attached directly to the optical image separation means, and the optical components and encoded holograms are arranged in relation to each other such that the disadvantages of the prior art are circumvented.

The object is achieved according to this invention in that

The image separation means is directly assigned with an external colour filter whose material comprises parallel vertical colour stripes of the primary colours RGB which are periodically repeated in the horizontal direction in the colour filter, The light modulator comprises a sequence of two inscribed holograms for each primary colour which are interleaved in six pixel columns for a left and a right observer eye, where the sequence of the holograms is periodically repeated in the horizontal direction in the light modulator, and The periods of the colour filters and of the holograms have a substantially identical size and are arranged in relation to each other such that each separating element is assigned with one colour stripe of the colour filter and at least two pixel columns with holograms of the primary colour of that colour stripe, in order to generate multi-coloured visibility regions.

According to the further embodiment of the present invention, the pixel columns which are assigned to a colour stripe of the primary colour comprise a hologram which has been computed for that primary colour.

The periodic assignment serves to achieve that one visibility region contains the superposed coloured images of all pixel columns for the left observer eye, and that the other visibility region contains the superposed images of all pixel columns for the right observer eye, thus holographically generating a multi-coloured three-dimensional object for the observer eyes.

It is further provided that a horizontal tracking of the multi-coloured visibility regions is effected by horizontally displacing the encoding of the holograms on the light modulator, so that the observer can continuously see the holographic reconstruction when he moves to another position.

In order to enlarge the visibility regions it is preferred that the pixel columns are imaged by the separating elements of the image separation means in a defocussed manner into the observer plane.

Each separating element of the image separation means can additionally be assigned with a number of non-activated pixel columns in order to increase the stereo contrast.

The manufacturing process of the holographic display device can be simplified if the face of the image separation means which is structured with the separating elements is attached to the colour filter and forms one unit with the latter.

The present invention offers the following advantages over the prior art: The colour presentation according to the aforementioned method allows a smaller useable pitch of the colour pixels and thus larger visibility regions for observer eyes. Crosstalk between neighbouring pixels is minimised by the specific optical path of the light.

When the light sources are tracked, observers can be addressed in a large angular range. All components are commercially available and can thus be replaced easily at any time in the event of defects. Further, they can be aligned easily to each other, which is of particular importance when manufacturing the display device as prototype or in small series.

BRIEF DESCRIPTION OF THE DRAWINGS

The present invention will be described in detail below with the help of embodiments in conjunction with the accompanying drawings, where FIG. 1a shows major components of a monochromatic holographic display device for generating a right and a left visibility region according to the prior art, FIG. 1b shows a detail of a front view of two pixel columns of a monochromatic light modulator with indication of the pixel pitch, FIG. 1c shows a detail of a front view of two pixel columns of the SLM with integrated colour filters and indication of the pixel pitch, FIG. 2a shows a detail of a holographic colour display with separating elements of an image separation means and pixels of an SLM with integrated colour filters, FIG. 2b shows a detail of a front view of two pixel columns of the SLM with integrated colour filters, FIG. 3a shows a detail of a holographic colour display according to this invention with a commercially available monochromatic SLM panel, an image separation means and assigned colour filters, and FIG. 3b shows a detail of an SLM of FIG. 3a, where the arrows indicate the assignment of the pixel columns which are covered by a separating element to a colour stripe according to this invention.

FIGS. 1 and 2 have been described in the prior art section above.

DETAILED DESCRIPTION OF THE INVENTION

The invention will now be described in more detail with reference to FIG. 3a, which is a top view that shows a detail of a holographic colour display. Coherent light which is emitted by a light source LQ illuminates through focussing optical means FM six pixel columns of a commercially available monochromatic SLM. The SLM is followed in the optical path by an optical image separation means L and a colour filter F whose transparent substrate material has parallel vertical colour stripes of the primary colours RGB which are periodically repeated in the colour filter F. Six holograms are written to the six pixel columns of the SLM in a horizontally interleaved manner. Two holograms HG for each primary colour R, G and B of the colour filter F, are interleaved in two pixel columns for a left and a right observer eye. These two holograms are assigned to one separating element, and this structure is periodically repeated across the entire SLM as follows: HGRL (red, left), HGRR (red, right), HGGL (green, left . . . ), HGGR, HGBL and HGBR. "Left" and "right" shall be understood to be the hologram for a certain colour for a left and a right visibility region, VWL and VWR, respectively. Both periods, namely that of the image separation means L and that of the colours filters F, and the holograms HG which are written to the SLM have about the same size. A certain difference in the size of the two periods is caused by perspective shortening due to the little distance between the image separation means L and the SLM. This difference is less than 1% though. The periods are repeated in the horizontal direction.

FIG. 3b shows schematically the front view of the pixel columns l and r of the monochromatic SLM with indication of the pixel pitch SP. This drawing shows the assignment of the pixel columns l and r with the individual colour stripes RGB of the colour filter F, where always two pixel columns are covered by one separating element. This assignment is made clear by the indication of the primary colour R, G and B, respectively, below the pixel columns. The pitch SP which is relevant for the encoding of a 3D object on the SLM is as large as that of the monochromatic display illustrated in FIGS. 1a/1b. Two visibility regions, VWL and VWR, are thus generated which have the same size as those of the monochromatic display illustrated in FIGS. 1a/1b. Subsequent pixel columns l and r of the SLM comprising the accordingly encoded holograms are alternately imaged to these visibility regions. All columns denoted with HGRL, HGGL and HGBL are imaged to the left visibility region VWL, and all columns denoted with HGRR, HGGR and HGBR are imaged to the right visibility region VWR. Each visibility region is thus provided with a mix of all primary colours RGB, and observer eyes can see a colour reconstruction of the 3D object.

The content of the holograms HGRL, HGRR, HGGL, HGGR, HGBL and HGBR can be displaced horizontally on the SLM, so to track the visibility regions VWL and VWR horizontally to an observer who moves to a different position. Since this displacement is only possible column-wise, the visibility regions can only be displaced discretely. A visibility region shall therefore be wide enough for the newly positioned visibility region to adjoin seamlessly to the previous position. Referring to FIG. 3a, the pixel columns are therefore imaged in a defocused manner by the cylindrical lenses, thus enlarging the width of the visibility regions. Since with the 1D encoding method used the imaging direction is the non-encoded direction, the extent of the visibility regions is increased by this defocusing.

Each separating element or each cylindrical lens can also be assigned with additional, non-activated pixel columns which lie between the activated pixel columns. They serve to improve the stereo contrast. If the visibility regions VWL and VWR partly overlap, the stereo contrast is reduced. Inserting such non-activated pixel columns can be advantageous if it is not possible to image the pixel columns without gaps or if they overlap. Seamless adjoining is necessary for tracking the visibility regions, and avoiding an overlapping is necessary for a high stereo contrast. Although inserting non-activated pixel columns causes a non-illuminated gap between the two visibility regions VWL and VWR, this gap will be illuminated when tracking the visibility regions horizontally e.g. by displacing the holograms by one pixel column.

The separating elements image all pixel columns with a left hologram into the observer plane, where they are superposed at a certain position, which forms the visibility region VWL for these holograms. This happens in the same way as in a monochromatic display device. Accordingly, all pixel columns with a right hologram are imaged to and superposed in one visibility region VWR.

The colour filters F are directly attached to the lenticular and filter the light for the corresponding pixel columns. They can for example be disposed on the structured side of the lenticular. A typical depth of the structure lies in the range of some 10 μm and is thus much smaller than the typical thickness of a cover glass of an LCD panel of about 1 mm. Disturbing effects thus occur on a much smaller scale because of the distance between the lens and the colour filter compared with the arrangement of the prior art with the distance between the pixel and the colour filter. This greatly reduces crosstalk caused by diffraction and enlarges the angular range for tracking the visibility regions. Effects of diffraction at the colour filters are reduced to a minimum because the pitch of the colour stripes is identical to the pitch of the cylindrical lenses and the pitch of the cylindrical lenses is larger than the pixel pitch.

The optical image separation means can also be realised in the form of a prism mask or barrier mask. In a barrier mask, the colour stripes of the colour filter correspond with the transparent regions of the mask.

The colour filter can for example be made inexpensively by colour exposure of a film which is subsequently aligned and attached e.g. on the lenticular. Alternatively, the colour filter can also be inserted between the lenticular substrate and the cylindrical lens structure. This is much easier than the disposition of filter layers in an SLM.

An alternative to generating coloured light with the help of colour filters is to use tinted separation elements, where a period of three primary colours R, G and B is assigned to three separating elements.

The invention claimed is:

1. Holographic colour display device comprising, in an optical path: light source means, focussing optical means, a controllable light modulator, and an optical image separation means with vertical separating elements, where the focussing optical means image sufficiently coherent light through controllable pixels of the controllable light modulator into an observer plane, said controllable pixels are arranged in the form of a matrix, and where the light is superposed to form visibility regions for observer eyes, and where the vertical separating elements of the optical image separation means image pixel columns in which holograms are encoded into respective visibility regions for each observer eye, wherein The image separation means is assigned with an external colour filter whose material comprises parallel vertical colour stripes of primary colours which are periodically repeated in a horizontal direction in the colour filter, The light modulator comprises a sequence of two inscribed holograms for each primary colour which are interleaved for a left and a right observer eye in six pixel columns, where the sequence of the holograms is periodically repeated in a horizontal direction in the light modulator, and periods of the colour filters and of the holograms have an identical size and are arranged in relation to each other such that each separating element is assigned with one colour stripe of the colour filter and at least two pixel columns with holograms of the primary colour of that colour stripe, in order to generate multi-coloured visibility regions.

2. Holographic display device according to claim 1, wherein the pixel columns which are assigned to a colour stripe of the primary colour comprise a hologram which has been computed for that primary colour.

3. Holographic display device according to claim 2, wherein one visibility region contains the superposed coloured images of all pixel columns for the left observer eye, and the other visibility region contains the superposed coloured images of all pixel columns for the right observer eye, thus holographically generating a multi-coloured three-dimensional object for the observer eyes.

4. Holographic display device according to claim 1, wherein a horizontal tracking of the multi-coloured visibility regions is effected by horizontally displacing the encoding of the holograms on the light modulator.

5. Holographic display device according to claim 1, wherein the pixel columns are imaged by the separating elements of the image separation means in a defocussed manner into the observer plane.

6. Holographic display device according to claim 1, wherein each separating element is additionally assigned with further, non-activated pixel columns in order to increase the stereo contrast.

7. Holographic display device according to claim 1, wherein a side of the image separation means which is structured with the separating elements is attached to the colour filter and the image separation means and the colour filter form one unit.

* * * * *